(12) United States Patent
Huang et al.

(10) Patent No.: US 8,594,057 B2
(45) Date of Patent: Nov. 26, 2013

(54) SEMI-PERSISTENT SCHEDULING METHOD

(75) Inventors: Yada Huang, Shenzhen (CN); Yincheng Zhang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 282 days.

(21) Appl. No.: 13/056,275

(22) PCT Filed: Jul. 15, 2009

(86) PCT No.: PCT/CN2009/072773

§ 371 (c)(1),
(2), (4) Date: Jan. 27, 2011

(87) PCT Pub. No.: WO2010/015167

PCT Pub. Date: Feb. 11, 2010

(65) Prior Publication Data

US 2011/0128896 A1    Jun. 2, 2011

(30) Foreign Application Priority Data

Aug. 6, 2008    (CN) .......................... 2008 1 0145386

(51) Int. Cl.
*H04W 74/04* (2009.01)
*H04W 74/00* (2009.01)
*H04J 3/00* (2006.01)

(52) U.S. Cl.
USPC ........... 370/336; 370/229; 370/329; 370/345; 370/437; 455/450

(58) Field of Classification Search
None
See application file for complete search history.

(56) References Cited

U.S. PATENT DOCUMENTS 8,054,767 B2 * 11/2011 Choi et al. .................... 370/280

8,320,319 B2 * 11/2012 Lohr ............................. 370/329

(Continued)

FOREIGN PATENT DOCUMENTS

| CN | 101119184 | 2/2008 |
|---|---|---|
| CN | 101154986 | 4/2008 |
| EP | 1 916 856 | 4/2008 |

OTHER PUBLICATIONS

Rapeepat Ratasuk et al., TDD Design for UMTS Long-Term Evolution, IEEE 19th Int'l Symp. on Pers., Indoor and Mobile Radio Comm., Sep. 15-18, 2008.*

International Search Report for International Application No. PCT/CN2009/072773, mailed Oct. 22, 2009.

(Continued)

*Primary Examiner* — Hanh N Nguyen
*Assistant Examiner* — Joshua A Kading
(74) *Attorney, Agent, or Firm* — Hunton & Williams LLP (57) ABSTRACT

A semi-persistent scheduling method is provided in the present disclosure, and the method comprises: when a semi-persistent scheduling periodicity comes, an evolved node B (eNB) and a terminal (UE) select a sub-frame in a sub-frame group as a sub-frame for current semi-persistent scheduling; the sub-frame group includes multiple sub-frames, and a sub-frame group periodicity equals to the semi-persistent scheduling periodicity. The problem that the sub-frames with the same relative position in different sub-frame groups are the sub-frames in which the collision between the initial transmission and the retransmission of the HARQ data packet most possibly occurs is considered by the technical solution of the present disclosure, so the purpose that prolonging the interval length of the collision between the initial transmission of the HARQ and the retransmission of the HARQ and reducing the collision between the initial transmission of the HARQ and the retransmission of the HARQ is achieved by reasonably configuring the number of sub-frames in a sub-frame group and alternately using different sub-frames in the sub-frame group.

25 Claims, 7 Drawing Sheets

(56) References Cited

U.S. PATENT DOCUMENTS

| | | |
|---|---|---|
| 2009/0257385 A1 | 10/2009 | Meylan et al. |
| 2009/0274107 A1* | 11/2009 | Park et al. .................... 370/329 |
| 2009/0290514 A1* | 11/2009 | Muharemovic et al. ...... 370/256 |
| 2010/0182939 A1* | 7/2010 | Ojala et al. .................... 370/280 |
| 2011/0182245 A1* | 7/2011 | Malkamaki et al. .......... 370/329 |
| 2012/0147803 A1* | 6/2012 | Cai et al. ....................... 370/311 |

OTHER PUBLICATIONS

English Translation of the Written Opinion of the International Search Authority in international application No. PCT/CN2009/072773, mailed on Oct. 22, 2009.

CATT, Collision avoidance in uplink semi-persistent scheduling for TDD Jan. 14-Jan. 18, 2008.

Nokia Corporation, Nokia Siemens Network, Persistent Scheduling for UL May 5-May 9, 2008.

* cited by examiner

FIG. 1

Prior Art

FIG. 2

Prior Art

FIG. 3

Prior Art

FIG. 4

Prior Art

SEMI-PERSISTENT SCHEDULING METHOD

CROSS-REFERENCE TO RELATED APPLICATIONS

This patent application is a U.S. national phase application of International Patent Application No. PCT/CN2009/072773, filed Jul. 15, 2009, which claims priority to China Patent Application No. 200810145386.X, filed Aug. 6, 2008, each of which is hereby incorporated by reference herein in its entirety.

TECHNICAL FIELD

The present disclosure relates to the field of communications, and in particular, to a semi-persistent scheduling method.

BACKGROUND

Figure 1:
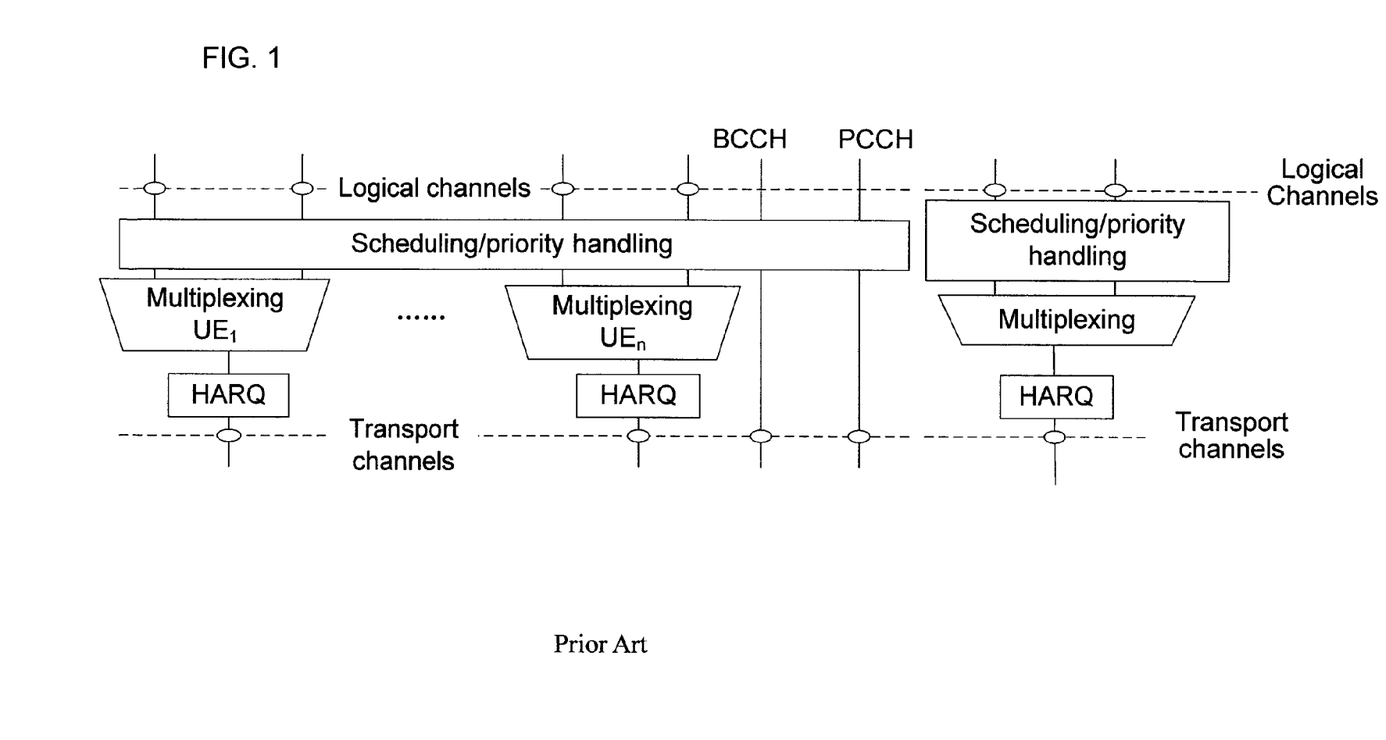
FIG. 1 is a schematic diagram of the structure of uplink layer 2 of an E-UTRAN.

FIG. 1 illustrates the structure of radio interface protocol uplink layer 2 of an E-UTRAN (evolved universal terrestrial radio access network) in a third-generation mobile communications LTE (long term evolution) system.

On a MAC (media access control) protocol layer, there is scheduling/priority handling functional entities, wherein the scheduling function supports dynamic scheduling and semi-persistent scheduling (or known as semi-static scheduling); and the priority handling function supports priority handling between different logical channels of one UE (user equipment) as well as priority handling between different UEs through dynamic scheduling.

Uplink dynamic scheduling function refers to that, on uplink, through a C-RNTI (cell radio network temporary identifier) on L1/L2 (layer 1/layer 2) control channel, the E-UTRAN is capable of allocating resources, such as PRBs (physical resource blocks) and an MCS (modulation and coding scheme), for a UE at each TTI (transmit time interval). When downlink reception is allowed (controlled by DRX (discontinuous reception function)), the UE always monitors the L1/L2 control channel to find possible resource allocation for uplink transmission. Herein the L1/L2 control channel refers to a PDCCH (physical downlink control channel), which is mainly used for carrying UL grant during uplink scheduling. During the uplink scheduling, the UE carries an SR (scheduling request) and a CQI (channel quality indicator) on a PUCCH (physical uplink control channel), and uplink data is transmitted on a PUSCH (physical uplink shared channel). With respect to uplink transmission of the UE, the E-UTRAN feeds back an acknowledgement/negative-acknowledgement message (ACK/NACK) in response to a hybrid ARQ (automatic repeat request) through a PHICH (physical hybrid ARQ indicator channel).

Uplink semi-persistent scheduling refers to that, the E-UTRAN may allocate predefined uplink resources, such as timing, resource, transport format and the like, for a first time HARQ (hybrid ARQ) transmission of the UE. During sub-frames in which resources are pre-allocated for the UE, the UE performs uplink transmission according to the predefined resources at corresponding TTI if the UE does not discover its C-RNTI on the L1/L2 control channel. A network decodes predefined PRB according to predefined MCS. In addition, During sub-frames in which resources are pre-allocated for the UE, the UE performs uplink transmission according to information indicated by the L1/L2 control channel at corresponding TTI if the UE discovers its C-RNTI on the L1/L2 control channel, that is, the allocation of the L1/L2 control channel overrides the predefined allocation at corresponding TTI, namely, at the corresponding TTI, the dynamic scheduling may cover the semi-persistent scheduling.

In general, the retransmission of the HARQ uses the dynamic scheduling; also maybe use the semi-persistent scheduling. Typically, the semi-persistent scheduling is applied to VoIP service. Initial configuration of the semi-persistent scheduling, such as semi-persistent scheduling periodicity (or called semi-persistent scheduling interval), is performed by an RRC (radio resource control) signaling. Activation of the semi-persistent scheduling is controlled by the PDCCH, and the PDCCH indicates whether the UL grant is semi-persistent or dynamic by a certain mechanism, for example, by a special C-RNTI different from that used for the dynamic scheduling. Generally, a UE allocated with pre-defined semi-persistent resource no longer needs to transmit a scheduling request through the PUCCH. For the retransmission of the HARQ by dynamic scheduling or semi-persistent scheduling, both adaptive retransmission and non-adaptive retransmission can be used. The time difference between the initial transmission of the HARQ and the retransmission of the HARQ is referred to as an HARQ RTT (Round-Trip Time).

Figure 2:
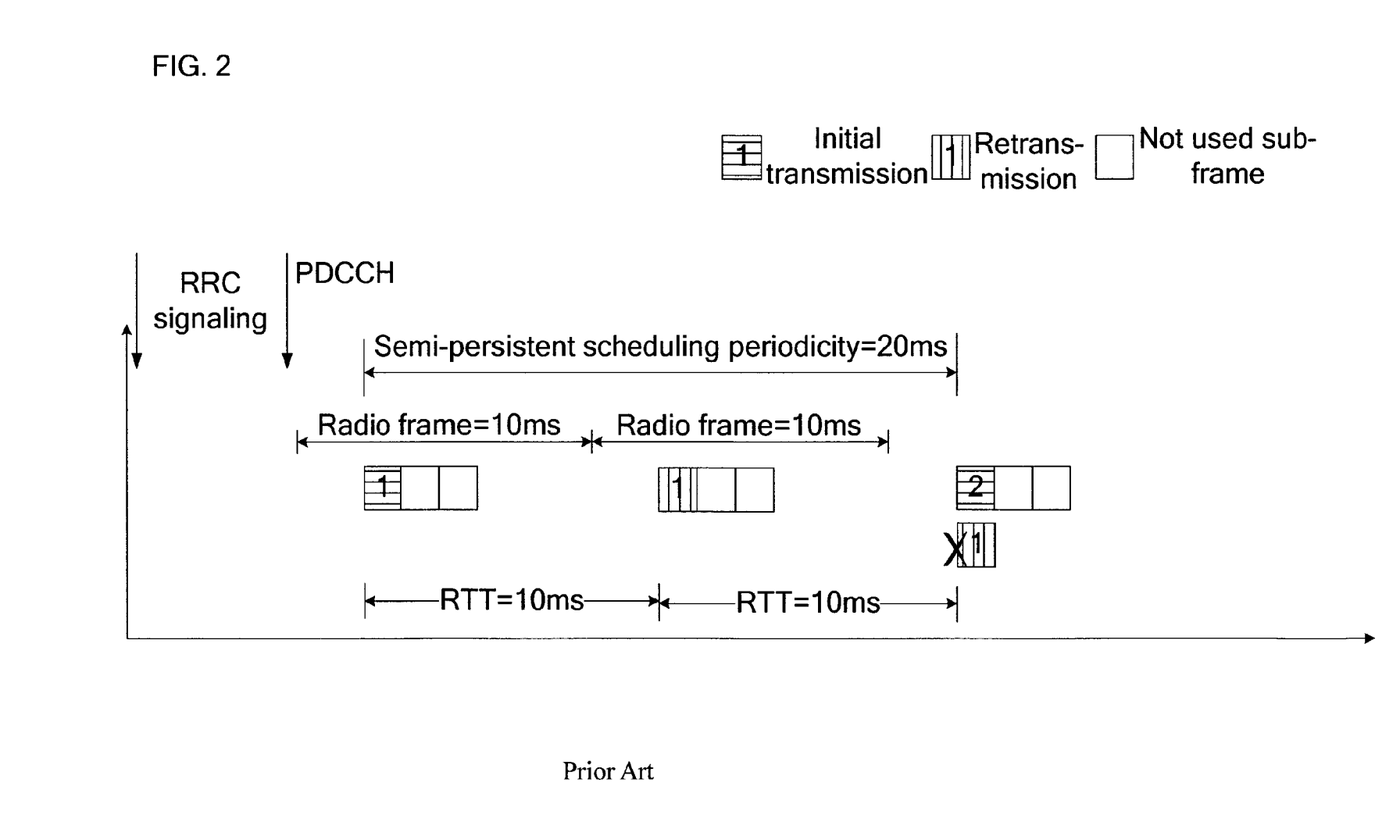
FIG. 2 is a schematic diagram of the collision between the initial transmission and the retransmission of the HARQ.
Figure 3:
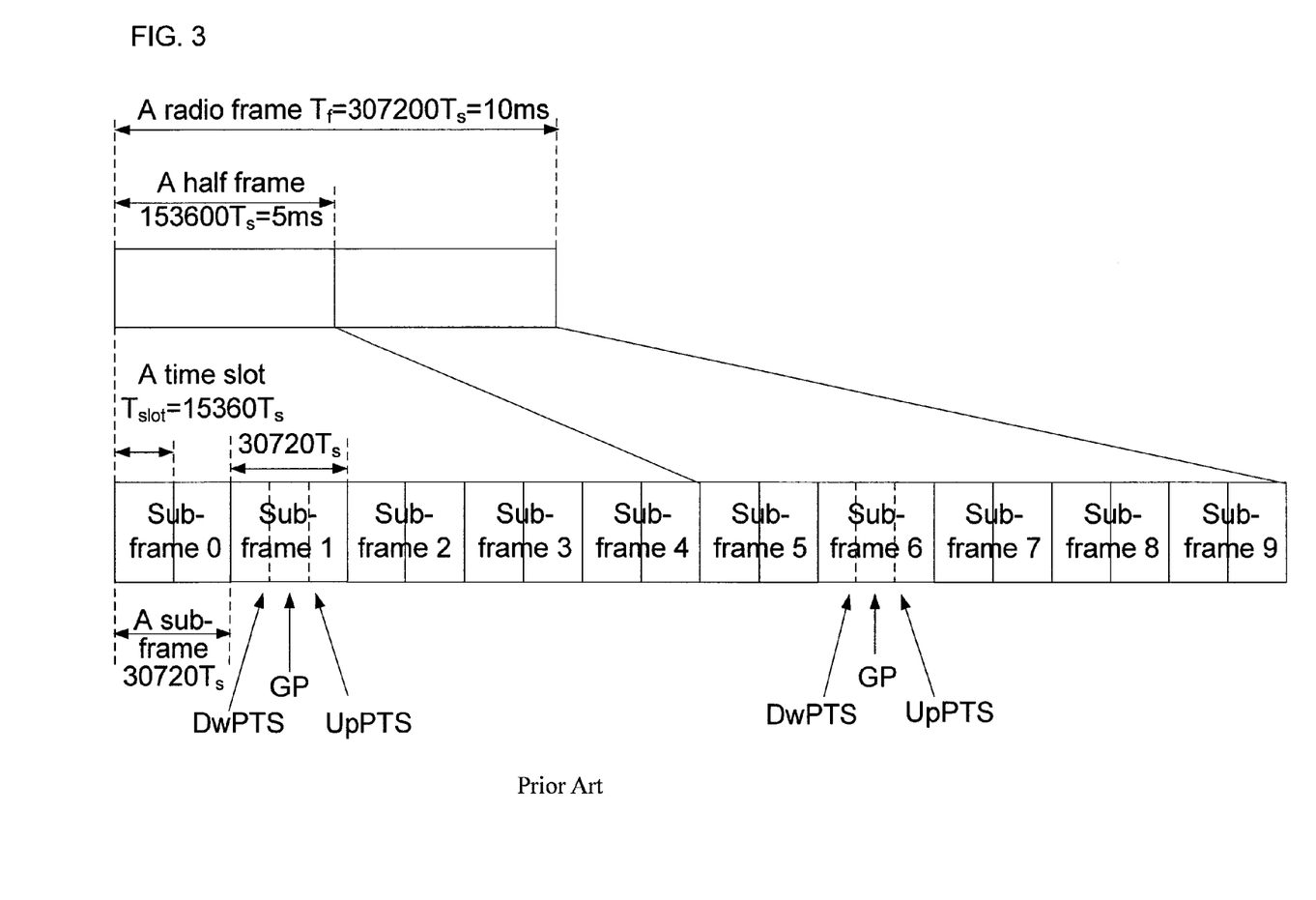
FIG. 3 is a schematic diagram of the structure of a radio frame in an LTE TDD system.

For uplink semi-persistent scheduling transmission, as synchronous HARQ technology is adopted, in the process of the semi-persistent scheduling, in the case that the least common multiple of the semi-persistent scheduling periodicity and the HARQ RTT is too small, that is, the timing collision interval between the retransmission of the HARQ and the semi-persistent scheduling is too small, an extra PDCCH signaling is required for scheduling. For example, in an LTE TDD (time division duplex) system, a typical HARQ RTT of uplink scheduling transmission in the LTE TDD system is 10 ms, while a data arrival interval for the VoIP (voice over internet protocol) service of the semi-persistent scheduling is 20 ms, the semi-persistent scheduling periodicity is also generally set to be 20 ms, which is just two times the HARQ RTT, so the least common multiple of the semi-persistent scheduling periodicity and the HARQ RTT is 20 ms, that is, the timing collision interval between the retransmission of the HARQ and the semi-persistent scheduling is 20 ms. As shown in FIG. 2, the boxes with horizontal stripes represent sub-frames used for transmitting initial data packets of the HARQ, the boxes with vertical stripes represent sub-frames used for retransmission, in which each numeral represents a serial number of each HARQ data packet. When the HARQ packet of the second VoIP is transmitted for the first time, it will collide with the second retransmission of the first VoIP packet. In the conditions of poor radio environment and many retransmissions, such collision possibly occurs per 20 ms, resulting in obviously increased signaling overhead on the PDCCH. It is suggested to configure a new semi-persistent scheduling periodicity to increase the least common multiple of the semi-persistent scheduling periodicity and the HARQ RTT so as to prolong collision interval. However, this configuration will cause the semi-persistent scheduling periodicity and the data arrival interval to be inconsistent, so that the upper layer needs to buffer arrived data for a while till the nearest semi-persistent scheduling periodicity comes, and then transmits the data. The time delay of buffering will increase as time goes on, until the time delay equals to the data arrival interval, then 2 upper layer data packets will be transmitted at a time, this cannot reuse the semi-persistent scheduling UL grant, and a new dynamic scheduling needs to be granted through the PDCCH. With respect to the radio frame of LTE TDD with the length of 10 ms, the frame structure is shown in FIG. 3, in which there are generally 7 configurations for the uplink and downlink sub-frames of a radio frame, as shown in Table 1 and FIG. 4.

TABLE 1

Radio Frame Configuration Scheme in the LTE TDD System

| Config-uration Number | Switch Point Periodicity | Sub-frame Serial Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

SUMMARY

The technical problem to be solved by the present disclosure is to provide a semi-persistent scheduling method to prolong timing collision interval between retransmission of HARQ and semi-persistent scheduling, and to avoid other problems caused by extra buffering which is needed by upper layer when a semi-persistent scheduling periodicity and a data arrival interval are inconsistent.

To solve the problem above, the present disclosure provides a semi-persistent scheduling method, comprising:

when a semi-persistent scheduling periodicity comes, an evolved Node B (eNB) and a terminal (UE) select a sub-frame from a sub-frame group as a sub-frame for the current semi-persistent scheduling; the sub-frame group includes multiple sub-frames, and a sub-frame group periodicity equals to the semi-persistent scheduling periodicity.

Further, during a semi-persistent scheduling, a sub-frames selected by the eNB from a sub-frame group for the current semi-persistent scheduling and a sub-frame selected by the UE from the sub-frame group for the current semi-persistent scheduling may have the same relative position in the sub-frame group; and a sub-frame selected for a semi-persistent scheduling and a sub-frame selected for a next semi-persistent scheduling may have different relative positions in sub-frame groups.

Further, the feature that the sub-frame group periodicity equals to the semi-persistent scheduling periodicity may refer to that:

in adjacent sub-frame groups, the number of sub-frames which are between two sub-frames with the same relative position in sub-frame groups may equal to the semi-persistent scheduling periodicity; and the semi-persistent scheduling periodicity may be represented by the number of sub-frames, and for an LTE TDD system, the semi-persistent scheduling periodicity only includes uplink or downlink sub-frames, or includes both uplink and downlink sub-frames.

Further, the semi-persistent scheduling periodicity may be notified by the eNB to the UE.

Further, during a semi-persistent scheduling, the operation that the eNB and the UE select an identical sub-frame in the sub-frame group for the current semi-persistent scheduling may refer to that:

the eNB and the UE may both select a sub-frames from the sub-frame group successively and circularly in sequence or inverted sequence; and sub-frames in the sub-frame group are sequenced in terms of time sequence.

Further, the method may further comprise:

a system specifies that sub-frames are selected in sequence or inverted sequence; or the eNB notifies the UE to select sub-frames in sequence or inverted sequence.

Further, the sub-frame group may be determined in the following way:

the eNB notifies the UE of the number N of sub-frames in the sub-frame group; in the process of the semi-persistent scheduling, the eNB indicates an initial sub-frame of the sub-frame group to the UE through a PDCCH with a semi-persistent scheduling grant; and for uplink semi-persistent scheduling in an LTE TDD system, the initial sub-frame and following continuous N−1 uplink sub-frames forms the sub-frame group.

Further, the sub-frame group may be determined in the following way:

the eNB notifies the UE of an initial sub-frame and the number N of the sub-frames in the sub-frame group; and for uplink semi-persistent scheduling in an LTE TDD system, N uplink sub-frames which begins from a first uplink sub-frame following the initial sub-frame form the sub-frame group if the initial sub-frame is a downlink sub-frame, or the initial sub-frame and the following continuous N−1 uplink sub-frames form the sub-frame group if the initial sub-frame is an uplink sub-frame.

Further, the sub-frame group may be determined in the following way:

a system predefines multiple sub-frame groups and configures an index number for each sub-frame group; and the eNB notifies the UE of the index number or indication information for indicating the sub-frame group.

Further, when the semi-persistent scheduling is activated for the first time, the eNB may indicate one sub-frame in the sub-frame group as the sub-frame for the first semi-persistent scheduling to the UE through a PDCCH with a semi-persistent scheduling grant.

DETAILED DESCRIPTION

The following explains the technical solution of the present disclosure in detail in combination with figures and embodiments.

To increase interval length of collision between initial transmission of HARQ and retransmission of HARQ and solve a problem of possible resource collision in semi-persistent scheduling, the present disclosure provides a semi-persistent scheduling method, which comprises:

when a semi-persistent scheduling periodicity comes, an eNB and a UE select a sub-frame from a sub-frame group as a sub-frame for the current semi-persistent scheduling; the sub-frame group includes multiple sub-frames, and a sub-frame group periodicity equals to the semi-persistent scheduling periodicity.

Wherein during a semi-persistent scheduling, a sub-frame selected by the eNB from a sub-frame group for the current semi-persistent scheduling and a sub-frame selected by the UE from the sub-frame group for the current semi-persistent scheduling have the same relative position in the sub-frame group; and a sub-frame selected for a semi-persistent scheduling and a sub-frame selected for a next semi-persistent scheduling have different relative positions in sub-frame groups.

Wherein the feature that the sub-frame group periodicity equals to the semi-persistent scheduling periodicity may refer to that: in adjacent sub-frame groups, the number of sub-frames which are between two sub-frames with the same relative position in sub-frame groups equals to the semi-persistent scheduling periodicity; the semi-persistent scheduling periodicity is represented by the number of sub-frames. For an LTE TDD system, the semi-persistent scheduling periodicity may only include uplink or downlink sub-frames, or include both uplink and downlink sub-frames. For an LTE FDD system, the semi-persistent scheduling periodicity may include uplink and downlink sub-frames. It should be noticed that the "number of sub-frames which are between two sub-frames with the same relative position in sub-frame groups" mentioned herein refers to the number of sub-frames between two sub-frames plus 1. For example, the interval between sub-frame 3 of radio frame $n_f$ and sub-frame 3 of radio frame $n_f+2$ is 20 sub-frames.

Optionally, the semi-persistent scheduling periodicity (or called semi-persistent scheduling interval) is notified by the eNB to the UE, and usually equals to data arrival interval.

The number N of sub-frames included in a sub-frame group is an integer which is greater than 1 and less than or equal to the number of uplink sub-frames in a semi-persistent scheduling periodicity. The greater N is, the greater interval of possible timing collision between the retransmission of the HARQ and the semi-persistent scheduling would be, but more buffering would be required, so a compromise would be made according to an actual system.

Optionally, in the LTE TDD system, when the method is used for uplink semi-persistent scheduling, sub-frames in a sub-frame group are all uplink sub-frames; when the method is used for downlink semi-persistent scheduling, sub-frames in a sub-frame group are all downlink sub-frames. In the LTE FDD system, there is no special requirement on sub-frames included in a sub-frame group when the method is used for uplink or downlink semi-persistent scheduling.

Optionally, the sub-frame group is determined in one or more of the following three ways:

(1) the eNB notifies the UE of the number N of sub-frames in the sub-frame group; in the process of the semi-persistent scheduling, the eNB indicates an initial sub-frame of the sub-frame group to the UE through a PDCCH with a semi-persistent scheduling grant; for uplink semi-persistent scheduling in an LTE TDD system, the initial sub-frame and following continuous N−1 uplink sub-frames form the sub-frame group; and the cases for downlink semi-persistent scheduling in an LTE TDD system or cases in an LTE FDD system can be analogized;

(2) the eNB notifies the UE of an initial sub-frame and the number N of sub-frames in the sub-frame group; for uplink semi-persistent scheduling in an LTE TDD system, N uplink sub-frames which begins from a first uplink sub-frame following the initial sub-frame form the sub-frame group if the initial sub-frame is a downlink sub-frame; or the initial sub-frame and the following continuous N−1 uplink sub-frames form the sub-frame group if the initial sub-frame is an uplink sub-frame; and the cases for downlink semi-persistent scheduling in an LTE TDD system or cases in an LTE FDD system can be analogized; and (3) a system predefines multiple sub-frame groups and configures an index number for each sub-frame group; and the eNB notifies the UE of the index number or specified indication information for indicating the sub-frame group. A sub-frame group is defined by parameters thereof, including an initial sub-frame and the value of N, and the composition of a sub-frame group is the same with the two cases above. Of cause, in actual application, serial numbers of sub-frames in a sub-frame group or character of sub-frames in a sub-frame group may be directly defined, such as all uplink sub-frames in a radio frame, etc.; in this way the composition of a sub-frame group is fixed during the definition.

Optionally, an initial sub-frame may be represented by its serial number.

Wherein with respect to the cases (1) and (2), sub-frames in a sub-frame group may be discontinuous.

Optionally, the operation that the eNB indicates an initial sub-frame of a sub-frame group to the UE through a PDCCH with a semi-persistent scheduling grant may refer to that: after receiving the PDCCH with the semi-persistent scheduling grant transmitted by the eNB in a downlink sub-frame, the UE takes an X-th sub-frame following the downlink sub-frame as an initial sub-frame; and the value of X is defaulted or preconfigured by a system.

Optionally, the eNB may, but not limited to, notify the UE through an RRC message.

Optionally, the operation that the eNB and the UE select an identical sub-frame in the sub-frame group may refer to that: the eNB and the UE both select a sub-frame from the sub-frame group successively and circularly in sequence or inverted sequence; and sub-frames in the sub-frame group are sequenced in terms of time sequence.

Specifically, N sub-frames in a sub-frame group are numbered 0, 1, 2, . . . , N−1 in terms of time sequence; when each semi-persistent scheduling periodicity comes, in a sub-frame group, relative to previous semi-persistent scheduling, a sub-frame with a next serial number is selected in sequence or inverted sequence according to sub-frame serial number. For example, in a sub-frame group including N sub-frames, selecting in sequence refers to selecting sub-frames in turn according to the sequence of the serial numbers of . . . , 0, 1, 2, . . . , N−1, 0, 1, . . . . Selecting in inverted sequence refers to selecting sub-frames in turn according to the sequence of the serial numbers of . . . , 0, N−1, N−2, . . . , 1, 0, N−1, . . . . The serial numbers and selecting according to the sequence of the serial numbers at the eNB and the UE may be implicit actions independent from each other.

Optionally, the method further comprises: a system specifies that sub-frames are selected in sequence or inverted sequence; or the eNB notifies the UE to select sub-frames in sequence or inverted sequence.

Optionally, when the semi-persistent scheduling is activated for the first time, the eNB indicates certain sub-frame in the sub-frame group as the sub-frame for the first semi-persistent scheduling to the UE through a PDCCH with a semi-persistent scheduling grant; in actual application, the eNB and the UE may appoint or default the initial sub-frame as the sub-frame for the first semi-persistent scheduling, or the sub-frame for the first semi-persistent scheduling as the initial sub-frame.

Optionally, the operation that the eNB indicates certain sub-frame in a sub-frame group as the sub-frame for the first semi-persistent scheduling to the UE through a PDCCH with a semi-persistent scheduling grant may refer to that: after receiving the PDCCH with the semi-persistent scheduling grant transmitted by the eNB in a downlink sub-frame, the UE takes a Y-th sub-frame following the downlink sub-frame as the sub-frame for the first semi-persistent scheduling; and the value of Y is defaulted or preconfigured by a system.

Optionally, selecting a sub-frame as the sub-frame for the current semi-persistent scheduling refers to: if there is an uplink data packet of HARQ which needs to be transmitted during the semi-persistent scheduling, the uplink data packet of HARQ is transmitted in the sub-frame.

The following three examples of uplink semi-persistent scheduling are given for further explanation.

Figure 5:
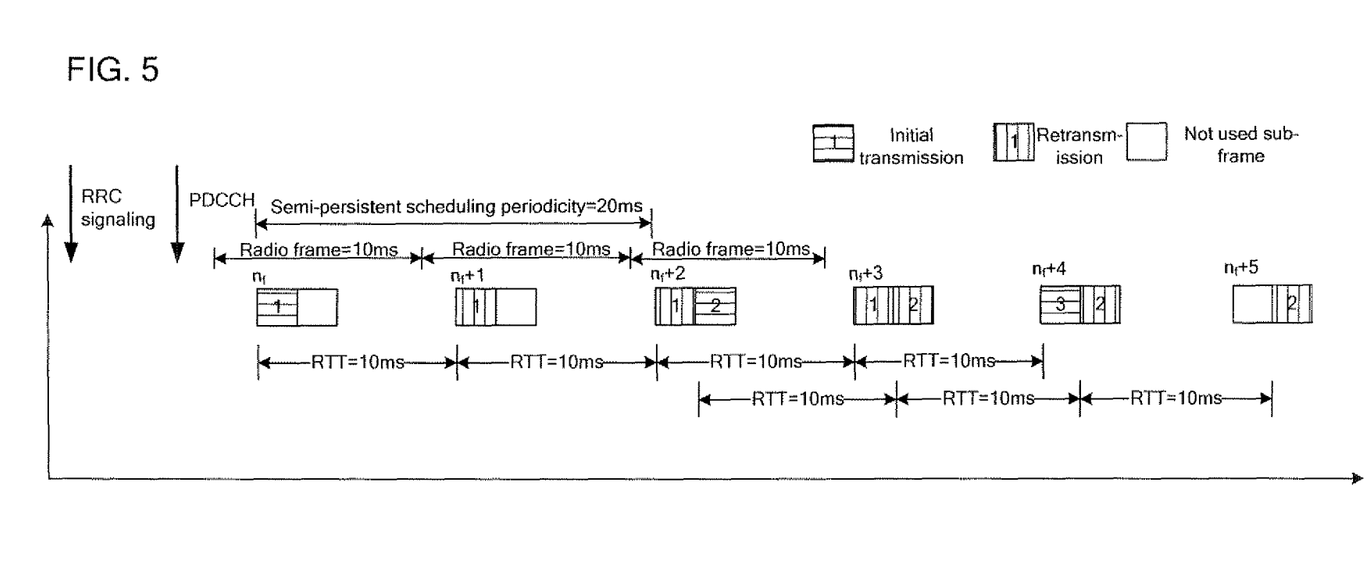
FIG. 5 is a schematic diagram of example 1 of the present disclosure.
Figure 6:
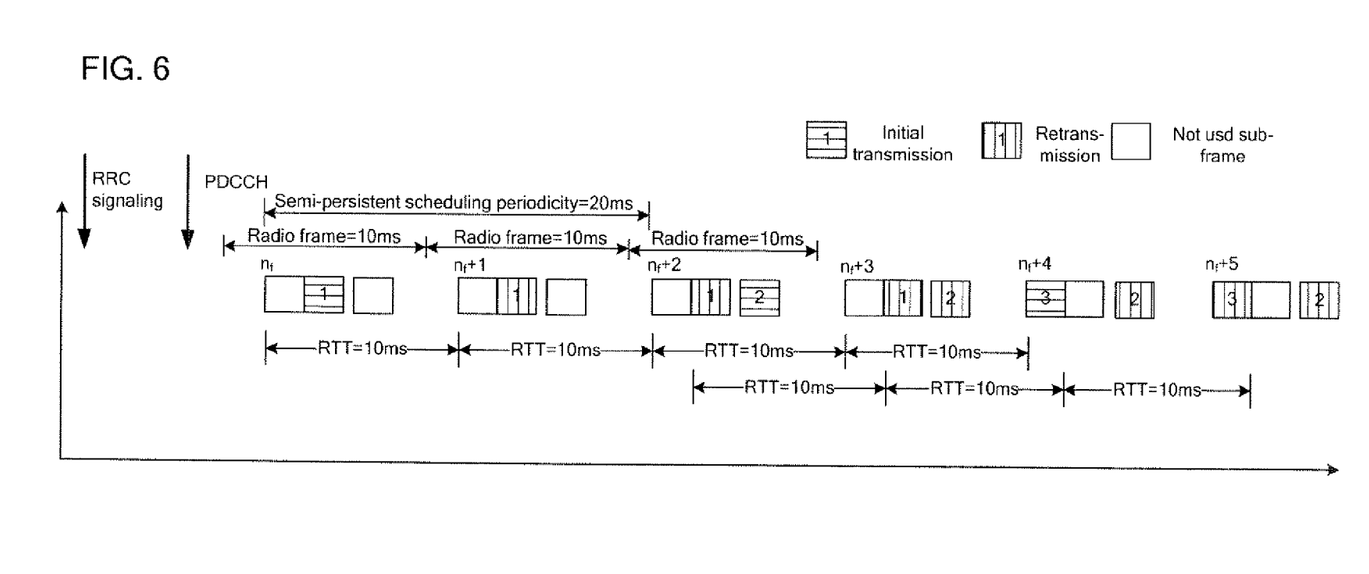
FIG. 6 is a schematic diagram of example 2 of the present disclosure.
Figure 7:
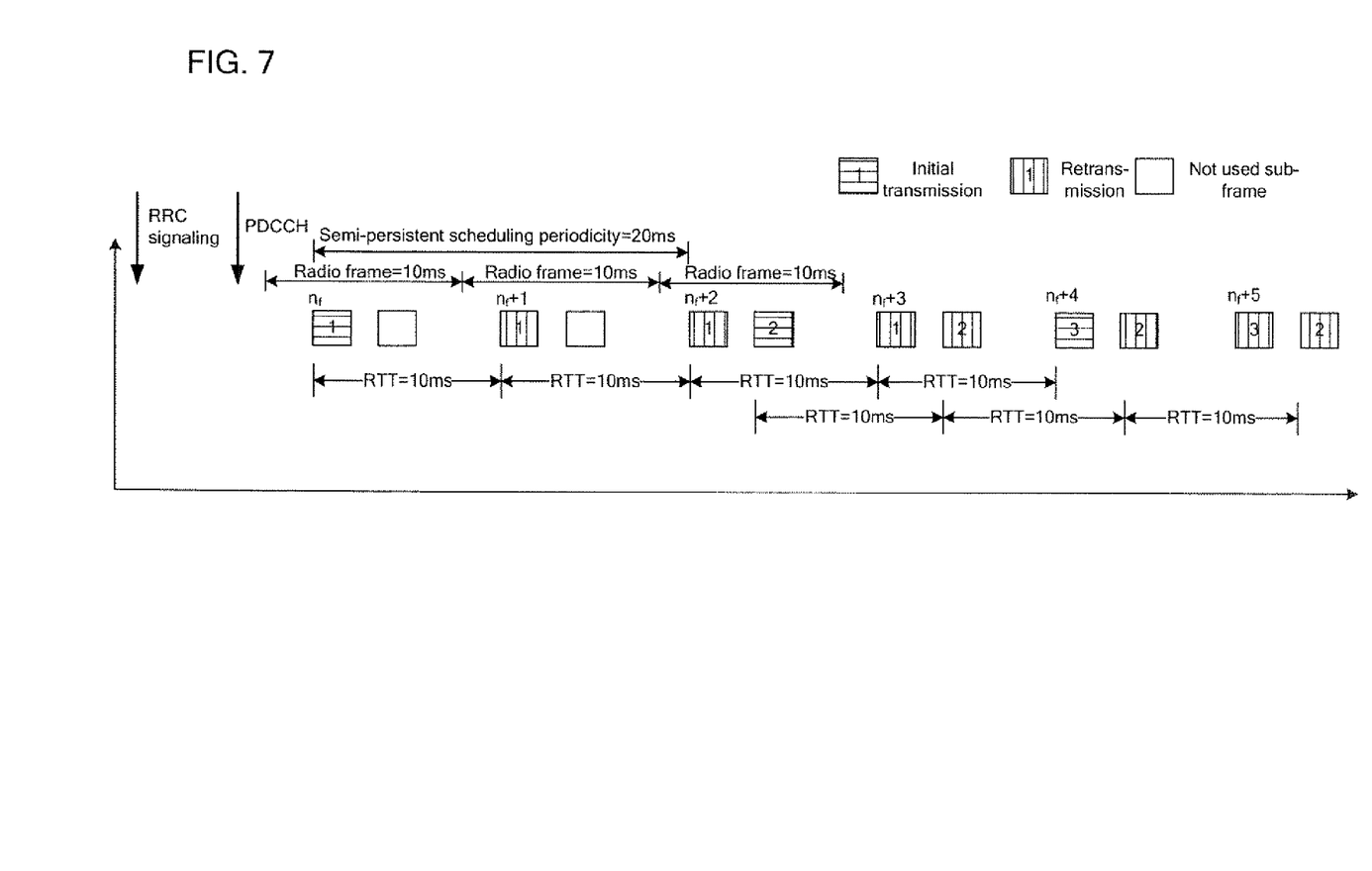
FIG. 7 is a schematic diagram of example 3 of the present disclosure.

In FIG. 5 to FIG. 7, the boxes with horizontal stripes represent the sub-frames used for transmitting initial data packet of the HARQ, and the boxes with vertical stripes represent the sub-frames used for retransmission, in which each numeral represents a serial number of each HARQ data packet.

Figure 4:
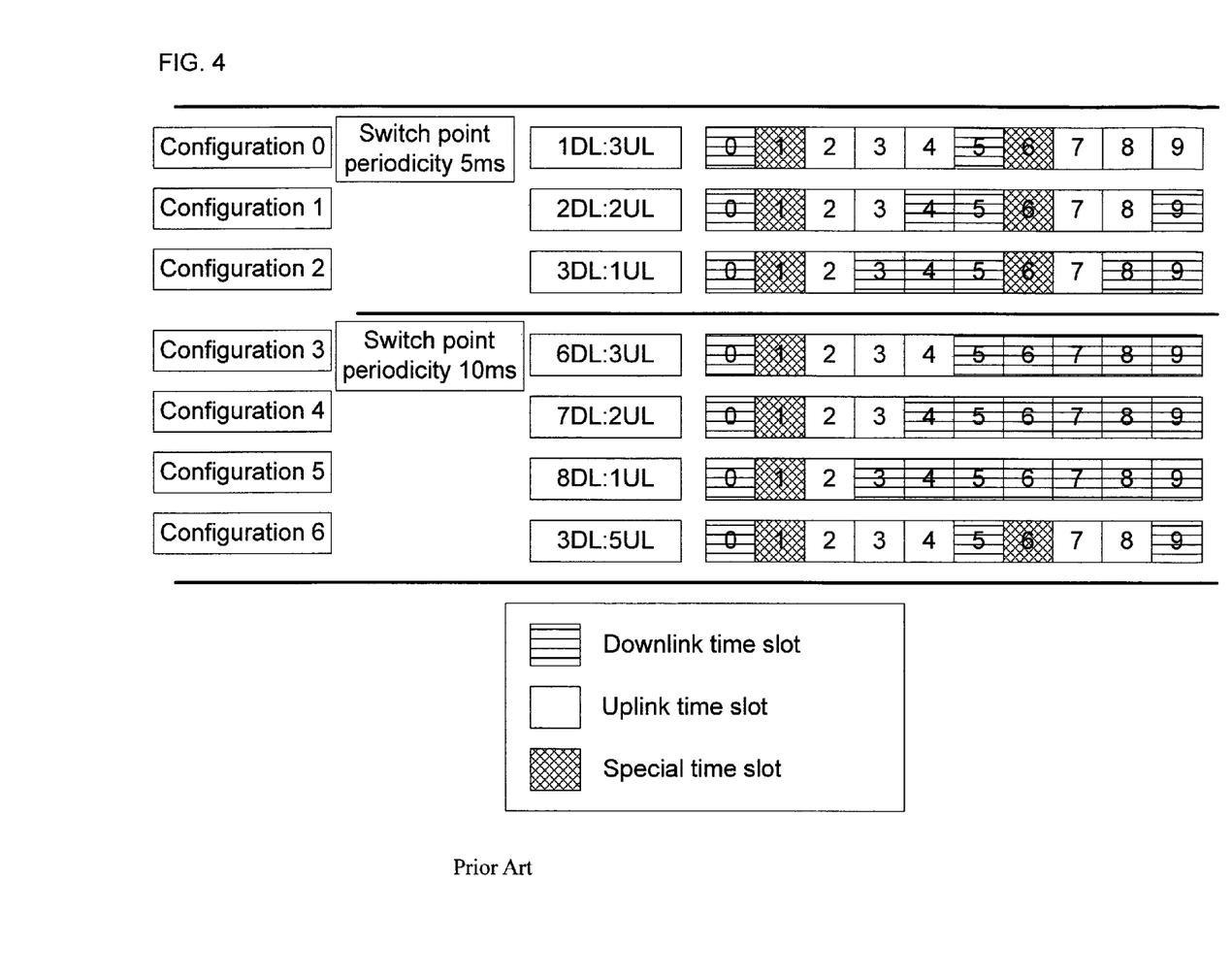
FIG. 4 is a schematic diagram of the configuration of a radio frame in the LTE TDD system.

Example 1 is shown in FIG. 5, taking the case that in a TDD system the configuration number of the sub-frame configuration scheme is 6 as shown in Table 1 and FIG. 4 and the data arrival interval is 20 ms as an example, the specific steps are as follows.

Step one: a UE (user equipment) is configured with uplink semi-persistent scheduling. The semi-persistent scheduling periodicity is configured to be 20 sub-frames including uplink and downlink sub-frames and equals to 20 ms, and the length N of a sub-frame group is 2 sub-frames; an eNB (evolved Node B) notifies the UE of the semi-persistent scheduling periodicity and the length N of the sub-frame group through an RRC signaling.

Step two: a PDCCH delivers a signaling to indicate that the uplink semi-persistent scheduling starts in sub-frame 3 of radio frame $n_f$, then, sub-frame 3 and 4 form a sub-frame group.

Step three: the UE transmits an initial data packet of a first uplink HARQ in sub-frame 3 of radio frame $n_f$. As HARQ RTT in a TDD system is 10 ms, sub-frame 3 of radio frame $n_f+1$, sub-frame 3 of radio frame $n_f+2$ and sub-frame 3 of radio frame $n_f+3$ are all possible used for retransmission of the HARQ packet.

Step four: the configured semi-persistent scheduling periodicity is 20 sub-frames; the length N of the sub-frame group is 2 sub-frames, a second radio sub-frame group is composed of sub-frame 3 and 4 of radio frame $n_f+2$, and sub-frame cycle mode is circulating in sequence, so an initial data packet of a second uplink HARQ is transmitted in sub-frame 4 of radio frame $n_f+2$. Retransmission of the second HARQ packet may be transmitted in sub-frame 4 of radio frame $n_f+3$, sub-frame 4 of radio frame $n_f+4$ and sub-frame 4 of radio frame $n_f+5$.

Step five: a third radio sub-frame group is composed of sub-frame 3 and 4 of radio frame $n_f+4$, and the sub-frame cycle mode is circulating in sequence, so an initial data packet of a third HARQ is transmitted in sub-frame 3 of radio frame $n_f+4$. Retransmission of the third HARQ packet may be transmitted in sub-frame 3 of radio frame $n_f+5$, sub-frame 3 of radio frame $n_f+6$ and sub-frame 3 of radio frame $n_f+7$.

In the present disclosure, the actual interval of the semi-persistent scheduling (i.e., the actual interval is equal to the number of the sub-frames between two adjacent sub-frames for the semi-persistent scheduling plus 1) is not definitely equal to the semi-persistent scheduling periodicity (20 sub-frames in this example) and will be changed dynamically. For example, the interval between the sub-frames used for transmitting the initial data packets of the first and second uplink HARQ in this example is 21 sub-frames, however, the interval between the sub-frames used for transmitting the initial data packets of the second and third uplink HARQ in this example is 19 sub-frames, which is just one of the characteristics of the present disclosure and breaks the conventions; because sub-frames used for adjacent semi-persistent schedulings are different, the collision frequency between the initial transmission of the HARQ and the retransmission of the HARQ is reduced.

Then, the UE computes the timing for transmitting each uplink HARQ data packet and transmits the uplink HARQ data packet in the uplink semi-persistent scheduling by analogizing the methods of steps three, four and five.

Example 2 is shown in FIG. 6, taking the case that in a TDD system the configuration number of the sub-frame configuration scheme is 1 as shown in Table 1 and FIG. 4, and the data arrival interval is 20 ms as an example, the specific steps are as follows.

Step one: a UE is configured with uplink semi-persistent scheduling scheme. The semi-persistent scheduling periodicity is configured to be 20 sub-frames including uplink and downlink sub-frames and equals to 20 ms, and a sub-frame group is set as follows: sub-frame 2 of a radio frame is set as an initial sub-frame, the length N of the sub-frame group is 3 sub-frames, and sub-frame cycle mode in the sub-frame groups is circulating in sequence; an eNB notifies the UE of the semi-persistent scheduling periodicity and the length N of the sub-frame group through an RRC signaling.

Step two: a PDCCH delivers a signaling to indicate that the uplink semi-persistent scheduling starts in sub-frame 3 of radio frame $n_f$; a first radio sub-frame group is composed of sub-frame 2, 3 and 7 of radio frame $n_f$.

Step three: the UE transmits an initial data packet of a first uplink HARQ in sub-frame 3 of radio frame $n_f$. As HARQ RTT in a TDD system is 10 ms, sub-frame 3 of radio frame $n_f+1$, sub-frame 3 of radio frame $n_f+2$ and sub-frame 3 of radio frame $n_f+3$ are all possible used for retransmission of the HARQ packet.

Step four: the configured semi-persistent scheduling periodicity is 20 sub-frames; a second radio sub-frame group is composed of sub-frame 2, 3 and 7 of radio frame $n_f+2$, and the configured sub-frame cycle mode is circulating in sequence, so an initial data packet of a second uplink HARQ is transmitted in sub-frame 7 of radio frame $n_f+2$. Retransmission of the second HARQ packet may be transmitted in sub-frame 7 of radio frame $n_f+3$, sub-frame 7 of radio frame $n_f+4$ and sub-frame 7 of radio frame $n_f+5$.

Step five: a third radio sub-frame group is composed of sub-frame 2, 3 and 7 of radio frame $n_f+4$, and the configured sub-frame cycle mode is circulating in sequence, so an initial data packet of a third HARQ is transmitted in sub-frame 2 of radio frame $n_f+4$. Retransmission of the third HARQ packet may be transmitted in sub-frame 2 of radio frame $n_f+5$, sub-frame 2 of radio frame $n_f+6$ and sub-frame 2 of radio frame $n_f+7$.

Then, the UE computes the timing for transmitting each uplink HARQ data packet and transmits the uplink HARQ data packet in the uplink semi-persistent scheduling by analogizing the methods of Steps three, four and five.

Example 3 is shown in FIG. 7, taking the case that in a TDD system the configuration number of the sub-frame configuration scheme is 2 as shown in Table 1 and FIG. 4, and the data arrival interval is 20 ms as an example, the specific steps are as follows.

Step one: a UE is configured with uplink semi-persistent scheduling scheme. The semi-persistent scheduling periodicity is configured to be 20 sub-frames including uplink and downlink sub-frames and equals to 20 ms, and a sub-frame group is predefined according to a protocol, it is provided that the predefined sub-frame group with the index number of 0 is: all the uplink sub-frames in a same radio frame form a sub-frame group, namely, in the radio frame of 10 ms in the current sub-frame configuration scheme, sub-frame 2 and 7 form a sub-frame group; circular selection in sequence is adopted; an eNB notifies the UE of the semi-persistent scheduling periodicity and the index number 0 of the predefined sub-frame group through an RRC signaling.

Step two: a PDCCH delivers a signaling to indicate that the uplink semi-persistent scheduling starts in sub-frame 2 of radio frame $n_f$; a first radio sub-frame group is composed of sub-frame 2 and 7 of radio frame $n_f+2$.

Step three: the UE transmits an initial data packet of a first uplink HARQ in sub-frame 2 of radio frame $n_f$. As HARQ RTT in a TDD system is 10 ms, sub-frame 2 of radio frame $n_f+1$, sub-frame 2 of radio frame $n_1+2$ and sub-frame 2 of radio frame $n_f+3$ are all possible used for retransmission of the HARQ packet.

Step four: a second radio sub-frame group is composed of sub-frame 2 and 7 of radio frame nf+2, and sub-frames are circularly selected in sequence, so an initial data packet of a second uplink HARQ is transmitted in sub-frame 7 of the $n_f+2$ radio frame. Retransmission of the second HARQ packet may be transmitted in sub-frame 7 of radio frame $n_f+3$, sub-frame 7 of radio frame $n_f+4$ and sub-frame 7 of radio frame $n_f+5$.

Step five: a third radio sub-frame group is composed of sub-frame 2 and 7 of radio frame $n_f+4$, and sub-frames are circularly selected in sequence, so an initial data packet of a third HARQ is transmitted in sub-frame 2 of radio frame $n_f+4$. Retransmission of the third HARQ packet may be transmitted in sub-frame 2 of radio frame $n_f+5$, sub-frame 2 of radio frame $n_f+6$ and sub-frame 2 of radio frame $n_f+7$.

Then, the UE computes the timing for transmitting each uplink HARQ data packet and transmits the uplink HARQ data packet in the uplink semi-persistent scheduling by analogizing the methods of Steps three, four and five.

Of course, the present disclosure may have numbers of other embodiments. Various modifications and variations can be devised by those skilled in the art without departing from the spirit and the principles of the present disclosure. It should be understood the devised modifications and variations belong to the protection scope of the claims disclosed therein.

INDUSTRIAL APPLICABILITY

The problem that the sub-frames with the same relative position in different sub-frame groups are the sub-frames in which the collision between the initial transmission and the retransmission of the HARQ data packet most possibly occurs is considered by the technical solution of the present disclosure, so the purpose that prolonging the interval length of the collision between the initial transmission of the HARQ and the retransmission of the HARQ and reducing the collision between the initial transmission of the HARQ and the retransmission of the HARQ is achieved by reasonably configuring the number of sub-frames in a sub-frame group and alternately using different sub-frames in the sub-frame group.

The invention claimed is:

1. A semi-persistent scheduling method, comprising:

at a semi-persistent scheduling periodicity interval, an evolved node B (eNB) and a terminal (UE) select a sub-frame from a sub-frame group as a sub-frame for the current semi-persistent scheduling, wherein the sub-frame group including multiple sub-frames and a sub-frame group periodicity is equal to the semi-persistent scheduling periodicity, wherein during a semi-persistent scheduling, a sub-frame selected by the eNB from a sub-frame group for the current semi-persistent scheduling and a sub-frame selected by the UE from the sub-frame group for the current semi-persistent scheduling have the same relative position in the sub-frame group; and a sub-frame selected for a semi-persistent scheduling and a sub-frame selected for an immediately next semi-persistent scheduling have different relative positions in their respective sub-frame groups, wherein the sub-frame group periodicity refers to the number of sub-frames between two sub-frames with the same relative position in their respective sub-frame groups, the two sub-frame groups for the two sub-frames are successive and with no other sub-frame group in between;

wherein for any two successive schedulings with no other scheduling in between, the sub-frames for the two successive schedulings have different relative positions in their respective sub-frame groups.

2. The method according to claim 1, wherein the sub-frame group periodicity is equal to the semi-persistent scheduling periodicity refers to that:

in adjacent sub-frame groups, the number of sub-frames which are between two sub-frames with the same relative position in sub-frame groups equals to the semi-persistent scheduling periodicity; and the semi-persistent scheduling periodicity is represented by the number of sub-frames, and for an LTE TDD system, the semi-persistent scheduling periodicity only includes uplink or downlink sub-frames, or includes both uplink and downlink sub-frames.

3. The method according to claim 2, wherein the semi-persistent scheduling periodicity is notified by the eNB to the UE.

4. The method according to claim 2, wherein the sub-frame group is determined in the following way:

the eNB notifies the UE of the number N of sub-frames in the sub-frame group;

in the process of the semi-persistent scheduling, the eNB indicates an initial sub-frame of the sub-frame group to the UE through a PDCCH with a semi-persistent scheduling grant; and for uplink semi-persistent scheduling in an LTE TDD system, the initial sub-frame and following continuous N−1 uplink sub-frames form the sub-frame group.

5. The method according to claim 2, wherein the sub-frame group is determined in the following way:

the eNB notifies the UE of an initial sub-frame and the number N of the sub-frames in the sub-frame group; and for uplink semi-persistent scheduling in an LTE TDD system, N uplink sub-frames which begin from a first uplink sub-frame following the initial sub-frame form the sub-frame group if the initial sub-frame is a downlink sub-frame, or the initial sub-frame and the following continuous N−1 uplink sub-frames form the sub-frame group if the initial sub-frame is an uplink sub-frame.

6. The method according to claim 2, wherein the sub-frame group is determined in the following way:
- a system predefines multiple sub-frame groups and configures an index number for each sub-frame group; and
- the eNB notifies the UE of the index number or indication information for indicating the sub-frame group.

7. The method according to claim 2, wherein
when the semi-persistent scheduling is activated for the first time, the eNB indicates one sub-frame in the sub-frame group as the sub-frame for the first semi-persistent scheduling to the UE through a PDCCH with a semi-persistent scheduling grant.

8. The method according to claim 3, wherein the sub-frame group is determined in the following way:
- the eNB notifies the UE of the number N of sub-frames in the sub-frame group;
- in the process of the semi-persistent scheduling, the eNB indicates an initial sub-frame of the sub-frame group to the UE through a PDCCH with a semi-persistent scheduling grant; and
- for uplink semi-persistent scheduling in an LTE TDD system, the initial sub-frame and following continuous N−1 uplink sub-frames form the sub-frame group.

9. The method according to claim 3, wherein the sub-frame group is determined in the following way:
- the eNB notifies the UE of an initial sub-frame and the number N of the sub-frames in the sub-frame group; and
- for uplink semi-persistent scheduling in an LTE TDD system, N uplink sub-frames which begin from a first uplink sub-frame following the initial sub-frame form the sub-frame group if the initial sub-frame is a downlink sub-frame, or the initial sub-frame and the following continuous N−1 uplink sub-frames form the sub-frame group if the initial sub-frame is an uplink sub-frame.

10. The method according to claim 3, wherein the sub-frame group is determined in the following way:
- a system predefines multiple sub-frame groups and configures an index number for each sub-frame group; and
- the eNB notifies the UE of the index number or indication information for indicating the sub-frame group.

11. The method according to claim 3, wherein
when the semi-persistent scheduling is activated for the first time, the eNB indicates one sub-frame in the sub-frame group as the sub-frame for the first semi-persistent scheduling to the UE through a PDCCH with a semi-persistent scheduling grant.

12. The method according to claim 1, wherein during a semi-persistent scheduling, the operation that the eNB and the UE select a sub-frame in the sub-frame group for the current semi-persistent scheduling refers to that:
the eNB and the UE both select a sub-frame from the sub-frame group successively and circularly in sequence or inverted sequence; and sub-frames in the sub-frame group are sequenced in terms of time sequence.

13. The method according to claim 12, further comprising:
a system specifying that sub-frames are selected in sequence or inverted sequence; or the eNB notifying the UE to select sub-frames in sequence or inverted sequence.

14. The method according to claim 12, wherein the sub-frame group is determined in the following way:
- the eNB notifies the UE of the number N of sub-frames in the sub-frame group;
- in the process of the semi-persistent scheduling, the eNB indicates an initial sub-frame of the sub-frame group to the UE through a PDCCH with a semi-persistent scheduling grant; and
- for uplink semi-persistent scheduling in an LTE TDD system, the initial sub-frame and following continuous N−1 uplink sub-frames form the sub-frame group.

15. The method according to claim 12, wherein the sub-frame group is determined in the following way:
- the eNB notifies the UE of an initial sub-frame and the number N of the sub-frames in the sub-frame group; and
- for uplink semi-persistent scheduling in an LTE TDD system, N uplink sub-frames which begin from a first uplink sub-frame following the initial sub-frame form the sub-frame group if the initial sub-frame is a downlink sub-frame, or the initial sub-frame and the following continuous N−1 uplink sub-frames form the sub-frame group if the initial sub-frame is an uplink sub-frame.

16. The method according to claim 12, wherein the sub-frame group is determined in the following way:
- a system predefines multiple sub-frame groups and configures an index number for each sub-frame group; and
- the eNB notifies the UE of the index number or indication information for indicating the sub-frame group.

17. The method according to claim 12, wherein
when the semi-persistent scheduling is activated for the first time, the eNB indicates one sub-frame in the sub-frame group as the sub-frame for the first semi-persistent scheduling to the UE through a PDCCH with a semi-persistent scheduling grant.

18. The method according to claim 13, wherein
when the semi-persistent scheduling is activated for the first time, the eNB indicates one sub-frame in the sub-frame group as the sub-frame for the first semi-persistent scheduling to the UE through a PDCCH with a semi-persistent scheduling grant.

19. The method according to claim 13, wherein the sub-frame group is determined in the following way:
- the eNB notifies the UE of the number N of sub-frames in the sub-frame group;
- in the process of the semi-persistent scheduling, the eNB indicates an initial sub-frame of the sub-frame group to the UE through a PDCCH with a semi-persistent scheduling grant; and
- for uplink semi-persistent scheduling in an LTE TDD system, the initial sub-frame and following continuous N−1 uplink sub-frames form the sub-frame group.

20. The method according to claim 13, wherein the sub-frame group is determined in the following way:
- the eNB notifies the UE of an initial sub-frame and the number N of the sub-frames in the sub-frame group; and
- for uplink semi-persistent scheduling in an LTE TDD system, N uplink sub-frames which begin from a first uplink sub-frame following the initial sub-frame form the sub-frame group if the initial sub-frame is a downlink sub-frame, or the initial sub-frame and the following continuous N−1 uplink sub-frames form the sub-frame group if the initial sub-frame is an uplink sub-frame.

21. The method according to claim 13, wherein the sub-frame group is determined in the following way:
- a system predefines multiple sub-frame groups and configures an index number for each sub-frame group; and
- the eNB notifies the UE of the index number or indication information for indicating the sub-frame group.

22. The method according to claim 1, wherein the sub-frame group is determined in the following way:
the eNB notifies the UE of the number N of sub-frames in the sub-frame group; in the process of the semi-persistent scheduling, the eNB indicates an initial sub-frame of the sub-frame group to the UE through a physical downlink control channel (PDCCH) with a semi-persistent scheduling grant; and for uplink semi-persistent scheduling in an LTE TDD system, the initial sub-frame and following continuous N−1 uplink sub-frames form the sub-frame group.

23. The method according to claim 1, wherein the sub-frame group is determined in the following way:

the eNB notifies the UE of an initial sub-frame and the number N of the sub-frames in the sub-frame group; and for uplink semi-persistent scheduling in an LTE TDD system, N uplink sub-frames which begin from a first uplink sub-frame following the initial sub-frame form the sub-frame group if the initial sub-frame is a downlink sub-frame, or the initial sub-frame and the following continuous N−1 uplink sub-frames form the sub-frame group if the initial sub-frame is an uplink sub-frame.

24. The method according to claim 1, wherein the sub-frame group is determined in the following way:

a system predefines multiple sub-frame groups and configures an index number for each sub-frame group; and the eNB notifies the UE of the index number or indication information for indicating the sub-frame group.

25. The method according to claim 1, wherein when the semi-persistent scheduling is activated for the first time, the eNB indicates one sub-frame in the sub-frame group as the sub-frame for the first semi-persistent scheduling to the UE through a PDCCH with a semi-persistent scheduling grant.

* * * * *